United States Patent
Riis

Patent Number: 5,413,144
Date of Patent: May 9, 1995

[54] SINGLE-LEVER MIXER VALVE PROVIDED WITH A DEVICE FOR PREVENTING PRESSURE SHOCK AT THE CLOSING MOVEMENT OF THE LEVER

[75] Inventor: Voldemar Riis, Vårgårda, Sweden

[73] Assignee: Gustavsberg Vargarda Armatur AB, Sweden

[21] Appl. No.: 162,199

[22] PCT Filed: Jun. 17, 1992

[86] PCT No.: PCT/SE92/00445

§ 371 Date: Dec. 16, 1993

§ 102(e) Date: Dec. 16, 1993

[87] PCT Pub. No.: WO92/22767

PCT Pub. Date: Dec. 23, 1992

[30] Foreign Application Priority Data

Jun. 17, 1991 [SE] Sweden ............... 9101852

[51] Int. Cl.⁶ .................. F16K 11/078; F16K 31/72
[52] U.S. Cl. ..................... 137/625.17; 137/625.4; 251/54
[58] Field of Search ........... 137/625.17, 625.4; 251/48, 54

[56] References Cited

U.S. PATENT DOCUMENTS

| | | | |
|---|---|---|---|
| 2,781,519 | 2/1957 | Marchant | 251/54 |
| 4,112,966 | 9/1978 | Carlson | 251/54 X |
| 4,708,172 | 11/1987 | Riis | 137/625.17 |
| 4,715,406 | 12/1987 | Kress | 137/625.17 |
| 4,723,574 | 2/1988 | Bergmann et al. | 137/625.17 |
| 4,736,772 | 4/1988 | Ostertag et al. | 137/625.17 |
| 4,768,749 | 9/1988 | Oberdorfer | 137/625.17 X |
| 4,936,347 | 6/1990 | Oracz et al. | 251/54 X |

FOREIGN PATENT DOCUMENTS

| | | |
|---|---|---|
| 3523350 | 1/1987 | Germany . |
| 449782 | 5/1987 | Sweden . |
| 455124 | 6/1988 | Sweden . |
| 462503 | 7/1990 | Sweden . |

Primary Examiner—John Rivell
Attorney, Agent, or Firm—Finnegan, Henderson, Farabow, Garrett & Dunner

[57] ABSTRACT

A single-lever mixer valve for liquids, for example hot and cold tap water. The valve comprises a housing, which is provided with an inlet for each of said liquids and a common outlet. A lever is provided for controlling the amount and the temperature of the liquid flowing out through the outlet. The lever is connected to an actuator in the valve housing that cooperates with a valve member. The actuator is provided with a built-in closing damper for reduction of hydraulic shock waves related to rapid closing of the mixer valve. The closing damper includes at least one sealed chamber and a movable piston for forcing an amount of fluid from the chamber via a throttling member when the lever is closed. When the fluid pressure in said chamber exceeds a certain value, the throttling member is adapted to be elastically deformed and pressed progressively against a sealing face in the actuator. The flow passages provided for fluid flow in the throttling member are reduced during said elastic deformation, so that flow resistance increases upon a fast-closing movement of the lever while flow resistance remains low upon a slow-closing movement of the lever.

4 Claims, 3 Drawing Sheets

SINGLE-LEVER MIXER VALVE PROVIDED WITH A DEVICE FOR PREVENTING PRESSURE SHOCK AT THE CLOSING MOVEMENT OF THE LEVER

TECHNICAL FIELD

The present invention refers to a mixer valve of the one-lever type for fluids, for example hot and cold water, and of the type that comprises a valve housing, which is provided with each an inlet and a common outlet for the liquids, an operating member for regulating the amount and the temperature of the fluid flowing out through the outlet, where the operating member is connected with a valve member cooperative actuator provided in the valve housing, whereby the actuator shows a built-in soft closing function intended to prevent too quick shut off of the valve, where the soft closing function includes at least one sealed chamber that comprises a movable piston which at the closing movement of the operating member is provided to press a fluid out from the chamber via a throttling member.

THE BACKGROUND OF THE INVENTION

At a quick shut off of certain mixing valves of the one-lever type, in particular if the water pipes are of small dimension, a pressure chock can occur that exposes the water piping system the strong loads as well as causing noise.

Through for example SE-B-462 503 and SE-B-455 124, mixer valves are known, which are provided to build up a pressure in a provided part of the valve upon a quick shut off of the valve lever, so that a certain damping resistance is obtained at the endphase of the lever, which requires added force and thereby extends the closing phase. This happens for the reason that the valve is equipped with a separate pressure chamber, that is filled up via a non-return valve when the valve opens. When closing the valve the water is pressed out from the pressure chamber through passages in the non-return valve, whereby a too rapid closing movements is slowed down.

These known, so-called soft-closing mixer valves show the disadvantage that they feel inert even at a normal shut off compared to a mixer without the soft-closing function. They are furthermore sensitive to impurities in the water, which may damage the parts included in the soft-closing function. Moreover the whole valve begins to leak if a leakage arises in the soft-closing function.

THE OBJECT OF THE INVENTION

The object of the present invention is to provide a mixer valve with a built-in soft closing function of the type mentioned in the introduction, which does not or in a very little degree affects the closing movement at a normal shut off of the valve and influences only at a quick-closing movement. This has according to the invention been achieved by the fact that the throttling member, when the pressure from the fluid is exceeding a certain value in said chamber, is pressed progressivly against a sealing face in the actuator and is thereby deformed elastically, whereby the flow passages arranged in the throttling member are reduced, so that the flow resistance increases for a quick-closing movement, while the flow resistance at a slow-closing movement is low.

BRIEF DESCRIPTION OF THE DRAWINGS

The invention will be described in the following with reference to the enclosed drawings which shows a preferred embodiment.

DESCRIPTION OF THE PREFERRED EMBODIMENT

Figure 1:
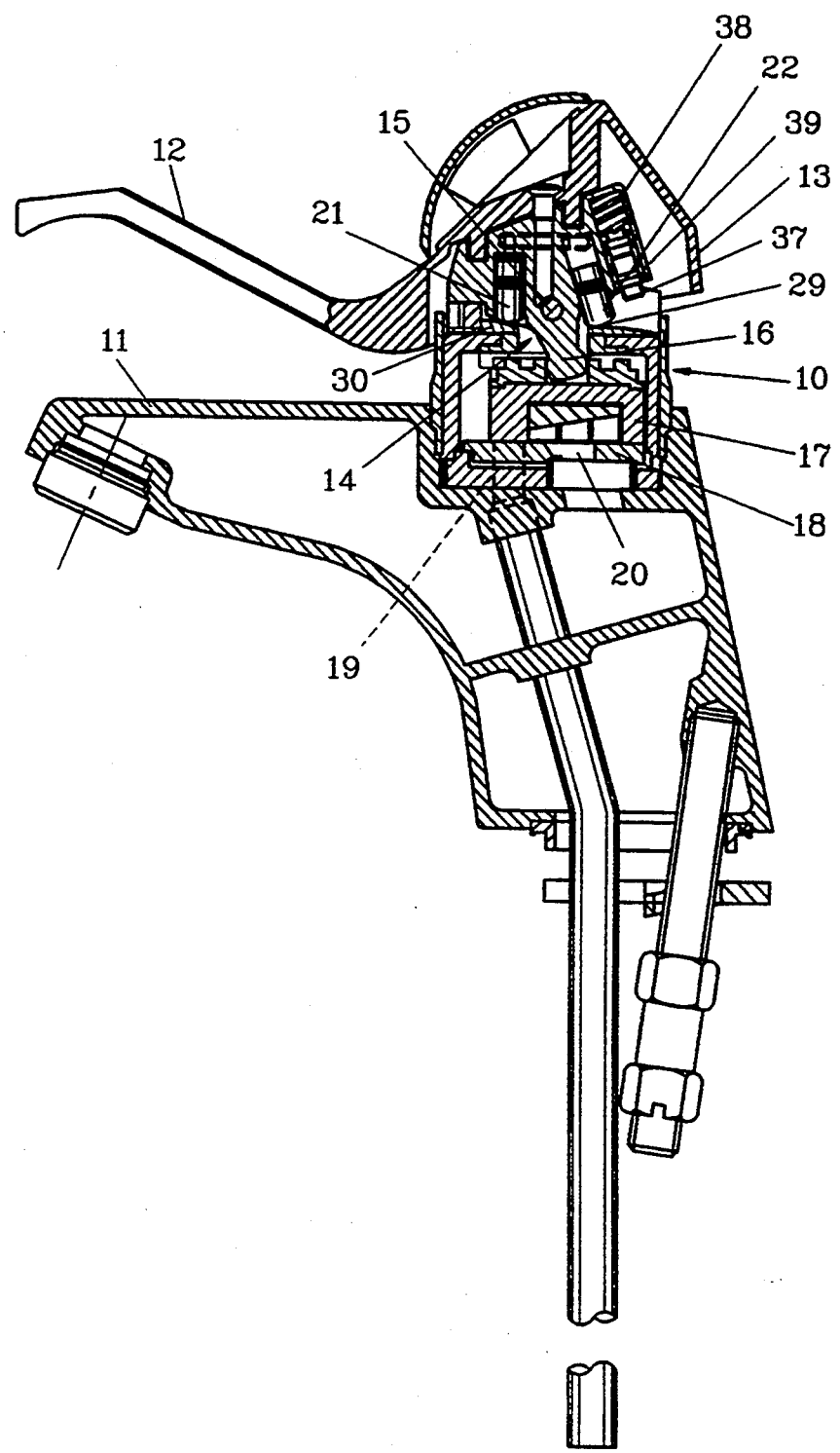
FIG. 1 is a vertical cross-section through a mixer valve, for example a mixer valve for wash basins, equipped with a device constructed according to the invention.

The mixer valve shown in FIG. 1 is of the so-called one-lever type and includes a valve housing 10 with a spout 11 and a control lever 12. The upper part 13 of the valve housing 10 is by means of the control lever 12 rotatable about a vertical axis, which permits regulation of the temperature of the outflowing water. The upper part 13 of the valve housing co-operates further with an actuator 14 pivoted about a horizontal axis 15.

The lever 12 can be regarded as a double-armed lever, which is pivoted about a vertical axis as well as about a horizontal axis and whose shorter lever arm 16 constitutes a part of the actuator 14 and actuates a movable valve plate 17. This plate 17 bears against another firm valve plate 18, which is provided with two inlet passages 19, of which only one is visible in the drawing, one for cold water and one for hot water respectively as well as an outlet passage 20, which communicates with the spout 11.

Figure 2:
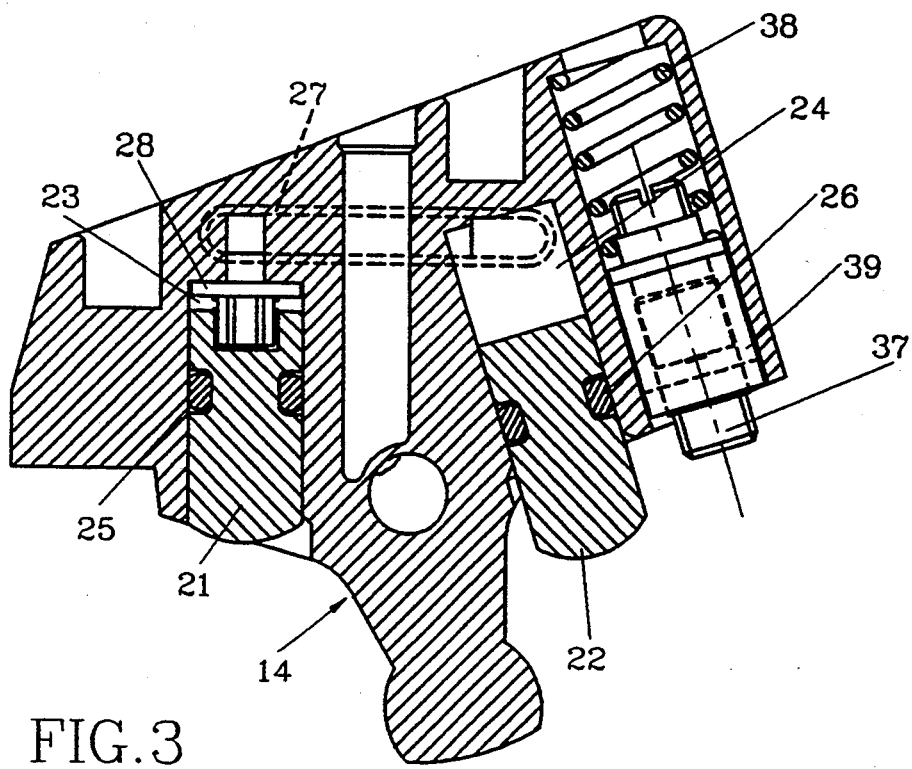
FIG. 2 shows the closed position of the valve on an enlarged scale a cross-section of the actuator placed in the valve housing.
Figure 3:
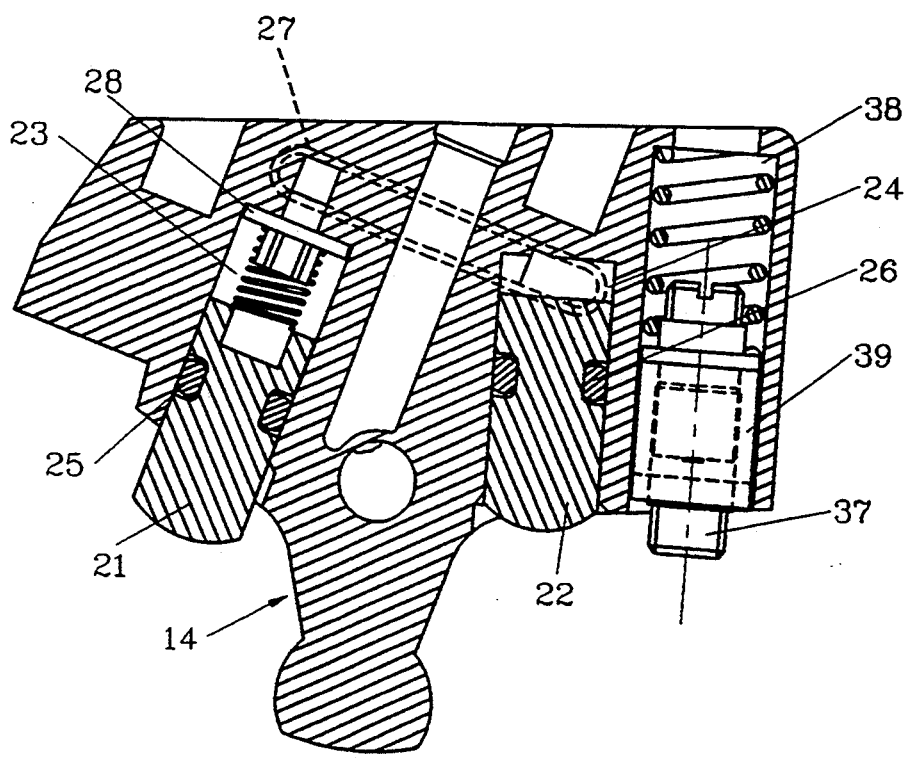
FIG. 3 is a section corresponding to FIG. 2 but in the open position of the valve.

In the actuator 14 there is provided a soft-closing function including two pistons 21 and 22, shown on an enlarged scale in FIG. 2 and 3, which are slidably fitted respectively in chamber 23 and 24 and sealed against these with O-rings 25 and 26 or another type of sealing. The chambers communicate with each other via a passage 27 in the actuator 14, the passage being filled by a fluid, for example oil. Between the first chamber 23 and the passage 27 there is provided a throttling member 28, which is described more in detail below.

The two pistons 21 and 22 co-operate respectively with stop faces 29 and 30 in the valve housing 10. When the valve is open (FIG. 3), the first piston 21 is pushed out a distance from its chamber 23, while the other piston 22 is pushed into its chamber 24. When shutting off the valve, i.e. by a swing movement downwardly of the lever 12, the first piston 21 will co-operate with the stop face 29 and be pressed into its chamber 23 and the fluid will be pressed out via the throttling member 28 to the passage 27 and into the other chamber 24 to press out the other piston 22 to the position shown in FIG. 2. When the valve opens, the fluid will flow in the opposite direction into the first chamber 23 via the throttling member 28.

This soft closing device is in contrast to earlier known inventions insensitive to impurities in the water, because it is not operating with tap-water as the pressure medium. Besides, the remaining function of the valve is not affected by a possible leakage in the soft-closing function. In response to a possible functional disturbance it is only needed to change the actuator 14. In earlier known devices it is necessary to change the whole control device, which is considerably more expensive as well as more complicated and requires a shut off of the tap-water.

Figure 4:
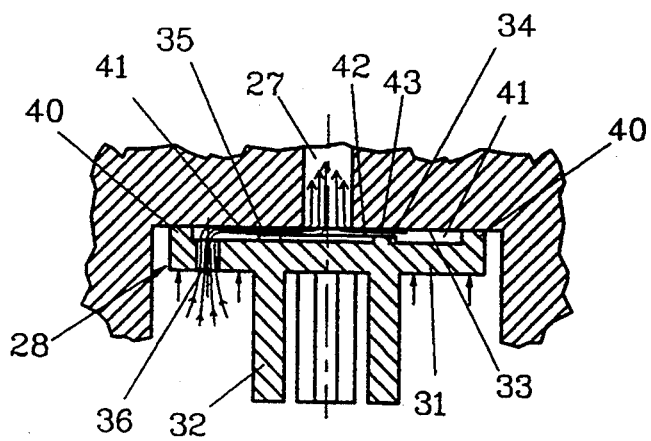
FIG. 4 shows on an enlarged scale in cross-section taken on line III—III of FIG. 6 the throttling member arranged in the device, in the unaffected normal position.
Figure 5:
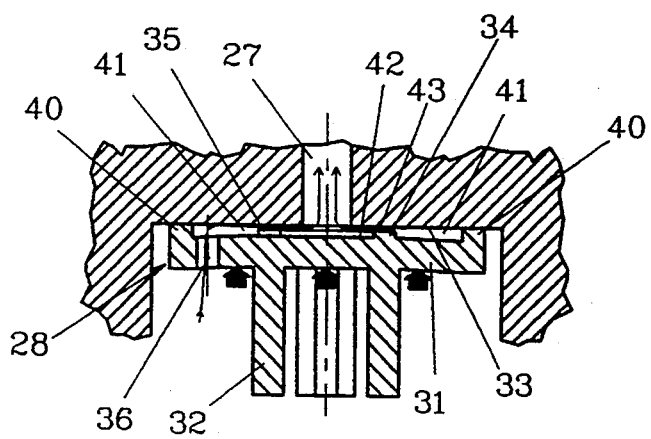
FIG. 5 discloses a cross-section analogous with FIG. 4 through the throttling member in the affected, throttled position.
Figure 6:
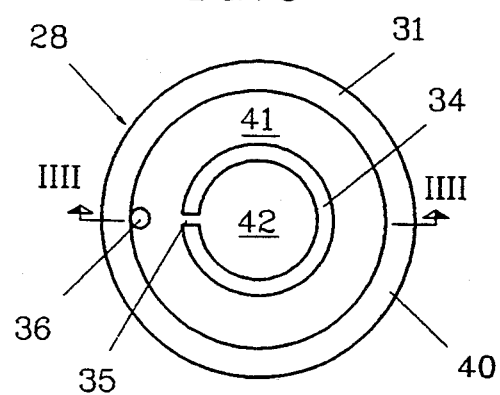
FIG. 6 discloses the plan view of the throttling member.

An example of a throttling member 28 is shown in detail in FIGS. 4, 5 and 6 and includes a disc 31 equipped with a guide pin 32, which guides vertically the disc in the chamber 23. The disc 31 interacts with a sealing face 33 in the actuator 14 and has on the side facing the sealing face 33 an inner, ring-shaped flange 34 provided with a radial opening 35 and an external ring-shaped flange 40. This flange 40 is axially slightly higher than the inner flange 34, so in interaction with the sealing face 33 a first ring shaped space 41 and another inner space 42 inside the flange 34 are formed. The space 41 communicates with the chamber 23 via a hole 36 and the space 42 is in communication with the passage 27. Between the end surface of the inner flange 34 and the sealing face 33 is a gap 43 formed when the throttling member is in its unactivated position. The throttling member 28 is in the shown example spring loaded, but the positioning can even be done with another method.

In FIG. 4 the throttling member 28, is shown in the unactivated position, i.e. when a fluid with low pressure can pass by the throttling member via the hole 36, the space 41, the opening 35 and the space 42, either at the opening movement of the valve from the chamber 23 to the passage 27 or in the contrary direction at a normal, slow closing movement. At a quick closing movement however, the pressure onto the disc 31 from the fluid in the chamber 23 will increase quickly, (see FIG. 5) whereby the flange 34 will be tightened against the sealing face 33 and an elastic deformation of the disc 31 occurs, so that the gap 43 between the sealing face 33 and the flange 34 is adjusted by means of the pressure in the chamber 23. Hereby the flow resistance increases in the throttling member 28 and the closing movement slows down. The throttling member 28 works progressively by this method, i.e. the faster the closing movement, the bigger the flow resistance and damping.

Such a progressive throttling member can naturally be designed in many different ways. The principle is however that it is elastically deformable when the pressure increases fast, caused by a quick closing movement, so that the size of the flow passages in the throttling member reduces and the closing movement slows down. The throttling member 28 can eventually be designed without the opening 35, whereby the lever movement completely stops at a quick shut off.

In the actuator 14 there is further provided a stop member by means of a screw 37 fixed in a cylinder 39 which is loaded by a spring 38, so that when the mixing valve opens the screw 37 will bear against a firm stop face which can be the same as the stop face 29. The purpose of the stop member is to limit the torsion of the actuator 14 about the axis 15 and thereby a limitation of the maximal outflow of liquid through the outlet 20. The position of the screw 37 in the cylinder 39 is adjustable for setting of increased maximal outflow.

Since the cylinder 39 with the screw 37 is mounted with a spring in the actuator 14, one can by placing the screw 37 against the stop face 29 and by pressing up the lever 12 further, temporarily increase the flow passing the stop position.

The invention is of course not limited to the embodiment shown but can be modified within the scope of the claims. Therefore the fluid can be a liquid or a gas and instead of the double piston arrangement shown, a simple single acting piston corresponding to the piston 21 can be used, for example a device affected only at the shut off of the mixing valve. The other pistons function can for example be taken over by an expandable accumulator. In this case the fluid can be air, or another gas.

I claim:

1. A single-lever mixer valve for liquids of different temperatures, comprising a housing which is provided with an inlet for each of said liquids and a common outlet, and a lever for controlling the amount and the temperature of the liquid flowing out through said outlet, an actuator, connected to said lever, provided in the housing and a valve member in the housing cooperating with said actuator, said actuator having a built-in closing damper for reducing hydraulic shock resulting from rapid closing of the mixer valve, said closing damper including at least one sealed chamber containing a fluid, a piston movable in said chamber, and a throttling member defining flow passages for said fluid, said piston adapted to force the fluid from the sealed chamber via said throttling member when the lever closes the mixer valve, said throttling member adapted to be deformed elastically when the fluid pressure in said chamber exceeds a predetermined value to cause a progressive reduction of the flow passages of the throttling member so that resistance to flow of the fluid increases at a fast-closing movement of the lever, while the resistance to flow of the fluid remains low at a slow-closing movement of the lever.

2. A single-lever mixer valve according to claim 1, wherein said actuator includes a sealing face and said throttling member comprises a deformable disc having ring-shaped flanges of differing heights facing the sealing face, said flanges forming together with the sealing face at least two chambers, and said flow passages including at least one variable gap for providing communication between the chambers, said progressive reduction of the flow passages occurring in response to the progressive pressing of said deformable disc closely toward said sealing face, thereby reducing the size of said variable gap.

3. A single-lever mixer valve according to claim 1, wherein said closing damper includes a second sealed chamber and a second piston which ms movable in said second chamber, a passage in the actuator providing communication between said chambers, said passage being filled with said liquid, and wherein said housing includes a first stop face, the piston at the closing movement of the lever being brought to bear against said first stop face and be forced into the sealed chamber against said liquid, whereby at the same time the second piston is forced out from the second chamber a corresponding distance by the effect of said liquid.

4. A single-lever mixer valve according to claim 3, wherein said housing includes a second stop face and said second piston is brought to bear against said second stop face at the opening movement of the lever and is forced into the second chamber against said liquid, whereby at the same time the piston is forced out from the sealed chamber a corresponding distance, said throttling member being positioned between the first chamber and the passage.

* * * * *